FIGURE 2

Oct. 3, 1967 W. V. SHEARER ET AL 3,345,065
SHEET TRANSPORT APPARATUS
Filed Dec. 22, 1964 7 Sheets-Sheet 3

FIGURE 3

INVENTORS.
WALTER V. SHEARER
WILLIAM R. BECK, JR.
ARNOLD M. WHEELOCK, SR.

ATTORNEY

FIGURE 9

INVENTORS.
WALTER V. SHEARER
WILLIAM R. BECK, JR.
ARNOLD M. WHEELOCK, SR.

ATTORNEY

United States Patent Office

3,345,065
Patented Oct. 3, 1967

3,345,065
SHEET TRANSPORT APPARATUS
Walter V. Shearer, Longmeadow, William R. Beck, Jr., Wilbraham, and Arnold M. Wheelock, Sr., Southwick, Mass., assignors to The Plastic Coating Corporation
Filed Dec. 22, 1964, Ser. No. 420,404
8 Claims. (Cl. 271—79)

This invention relates to sheet transport apparatus and particularly to sheet transport apparatus adapted to form a component part of apparatus for the photoelectrostatic reproduction of images.

Apparatus for the photoelectrostatic reproduction of images which includes the sheet transport apparatus of this invention is described and claimed in our copending application, Ser. No. 189,758, filed Apr. 24, 1962, now U.S. Patent No. 3,180,239. In that apparatus, a photoelectrostatic sheet is picked up by a vacuum platen which carries it facing downwardly over a corona discharge unit to impose an electrostatic charge on its surface carrying a photoelectrostatic coating, brings the charged surface into the focal plane of an optical system in which it is exposed to an optical image to produce a latent electrostatic image in its surface and then returns the sheet to the starting point of the movement of the vacuum platen but in a laterally displaced position.

The transport apparatus in accordance with this invention is particularly adapted to pick up the flexible sheet carrying a latent electrostatic image from the vacuum platen of this apparatus, carry it over a toning unit, under a unit which provides heat to fuse the toner and finally deliver the sheet to a convenient location to be picked up by the operator of the apparatus.

The transport apparatus of this invention comprises three separate, but cooperating sections. The first of these sections is comprised of two transport chains carried in parallel planes by sprockets. These transport chains are preferably the roller type sprocket chains. These parallel chains carry two grippers each of which are adapted to grasp the edge of a flexible sheet. In the apparatus described by our copending application, Serial No. 189,758, filed April 24, 1962, now U.S. Patent No. 3,180,239, this first section of the transport apparatus of this invention is in a position such that each of its grippers can grasp the edge of a sheet carried by the vacuum platen when the vacuum platen is in its laterally displaced position. This first section of the transport apparatus then carries the sheet laterally, with its electrostatic image-bearing surface facing surface downwardly into contact with the upper peripheries of the brushes of a toner mechanism. This section of the transport apparatus then carries the sheet upwardly and deposits it on a second section of the apparatus, with its now toned surface facing upwardly.

Each of the grippers carried by the transport chains of this first section of the apparatus is insulated from each of the transport chains by a block of plastic insulation which has a strength such that it will shatter under any abnormally high stress which could, otherwise, damage the conveyor. This is a valuable safety feature of the apparatus, since the transport apparatus could, otherwise, be damaged by a gripper pulling a strong photoelectrostatic sheet which was improperly caught in the cooperating vacuum platen transport system.

In addition to being insulated from the transport chains by insulating blocks, each gripper has leaves made of an insulating material, or made of a metal which is coated with a layer of insulating material. The combination of the insulating blocks and the insulation of the gripper leaves eliminates the possibility of an electrical short circuit either of the latent electrostatic image on the surface of a photoelectrostatic sheet being carried by the gripper, or of a bias voltage applied to the sheet during its toning.

The electric motor which drives the transport chains of this first section of the conveyor system is provided with an electric brake, which is operated by a relay. This relay is first cocked, and then activated by limit switches operated by accurately positioned lugs on one of the transport chains. This use of lugs on the transport chains to preliminarily cock the relay and then to activate it provides a simple and highly efficient means for positively stopping the gripper at the exact location at which it is to receive a photoelectrostatic sheet.

This first section of this transport apparatus is provided with a sweep at the point that the travel of the sheet carried by one of its grippers goes from longitudinal to vertical travel around which the back of the sheet passes as it changes its direction of travel. Two spring loaded idler rolls ride on the marginal edges of the face of the sheet to hold its back surface in contact with this sweep, and to prevent its trailing end from flipping outwardly to bring the toned face into contact with the inside of the adjacent wall of the cabinet in which the apparatus is located.

This first section of the transport apparatus is provided with a second pair of spring-loaded idler rolls, located near its upper or exit end at the point at which a sheet carried by this section of the apparatus is transferred to its second section. The idler rolls ride on the marginal edges of the image side of the sheet which, at this point, is facing upwardly and assure that the back of the sheet is in contact with the belts of the second section of this transport apparatus.

The second section of this apparatus consists of a plurality of parallel belts carried by rollers which are spaced apart in a substantially horizontal direction. A sheet carried by the first section of the apparatus is deposited on those belts by the opening of the gripper by which it has been carried upwardly.

Racks are positioned below the spaces between the parallel belts of this second section of the apparatus. These racks can be raised to positions above the upper surfaces of the conveyor belts by the manual operation of a convenient lever on the top of the cabinet of the apparatus. When in their raised position, the racks lift a copy sheet off of the conveyor belts, interrupt its travel, and hold it in a position from which it can be manually removed for inspection by the operator of the apparatus. When in their lowered position, the racks do not interfere with the travel of a copy sheet to the third section of this transport apparatus.

These racks may be automatically operated, as an alternative to manual operation. In such automatic operation, the rack is automatically raised by the approach of a copy sheet to interrupt the travel of the sheet for a momentary interval which permits its visual inspection and, if desired, its removal from the rack for any desired manual revision. At the end of the momentary interval during which the rack is raised, it is then automatically lowered to its position of rest below the upper surfaces of the belts to permit the copy sheet to resume its travel to the third section of this transport apparatus.

The provision for the interruption of the automatic processing of a copy before it becomes fixed by the fusing of the toned image is an important feature of this apparatus. It is frequently desirable in the production of such copy for the operator of the apparatus to make a leisurely inspection of the reproduced image and, if desired, make manual deletions from the image and then return the copy to the apparatus for the fusing step, which makes the reproduced image permanent. The design of this apparatus places the racks for this interruption of the travel of the copy at the top of the apparatus, which is convenient to the operator of the apparatus. Furthermore, the location is such that the operator has a brief opportunity to judge whether or not is is desirable to interrupt the completion of a given copy before its forward progress is, in fact, interrupted.

A copy sheet guide is positioned along each edge of this second section of the transport apparatus and extends from a point near its upper midsection, across a gap between its exit end and the entrance end of the third section of the apparatus, and over a portion of the third section of the apparatus adjacent its entrance end. These copy sheet guides adjust any mid-alignment of the copy sheets, and assure that a pair of their opposite parallel edges are parallel to the direction of travel of the second and third sections of the apparatus as they pass from the second to the third section thereof.

The third section of this transport apparatus receives the toned copy sheet, with its toned surface still facing upwardly, and carried it beneath the fuser unit which fuses the toner and renders the now visible image permanent. It includes in succession along the line of travel of the copy sheet, a solid belt conveyor, a delivery sweep which turns the sheet in an upwardly direction and reverses the direction of its travel, and a pair of rolls which receive the copy sheet from the delivery sweep and deposits it in the copy-receiving station of the apparatus.

The solid belt conveyor of this third section of the conveyor system includes two parallel rolls which carry a single belt which is of the width of the apparatus. One of these two parallel rolls is a driven roll, while the other is an idler roll. The driven roll is, preferably, the one at the exit end of the conveyor belt adjacent the delivery sweep.

This conveyor belt has a crown sweep positioned beneath its upper span which carries the copy sheet beneath the fuser unit. This crown sweep is, preferably, a sheet of metal or other material having a high heat conductivity. It is curved upwardly along the direction of travel of the upper span of the conveyor belt, and bears on the lower surface of that span of the belt to cause the upper span of the belt to travel in an upwardly arcuate path as it passes beneath the fuser unit.

This crown sweep is an important feature of this apparatus. It causes the copy sheet to follow a curved path of travel under the fuser unit, which prevents it from curling across its direction of travel and, thereby, prevents its edges from coming into direct contact with the fuser unit. This eliminates a serious fire hazard in the operation of the apparatus, since the curling of the copy sheet into direct contact with the hot fuser unit could, and probably would, cause the sheet to catch fire.

Although the direction of travel of the second and third sections are close to horizontal, the second section has a slightly upward angulation with respect to the general direction of travel of the third section, with the result that a photoelectrostatic sheet passing from the second section to the third section passes over a hump. This hump contributes to the action of the crown sweep in preventing the sheet from curling across its direction of travel.

The crown sweep provides a second important feature in that it tends to eliminate the fire hazard in the fusing step which is present even when the copy sheet is in its normal, uncurled position on the conveyor belt. This hazard becomes particularly serious during a stoppage of the third conveyor when a sheet is beneath the fuser unit. It conducts heat away from the area of the conveyor belt directly beneath the fuser unit and, in turn, from the lower surface of the copy sheet. This prevents the body of the copy sheet from rising to its combustion temperature while the resinous toner on its upper surface is being fused.

Having now generally indicated the nature of the transport apparatus in accordance with this invention, a specific embodiment thereof will be described with reference to the accompanying drawings in which.

Figure 1:
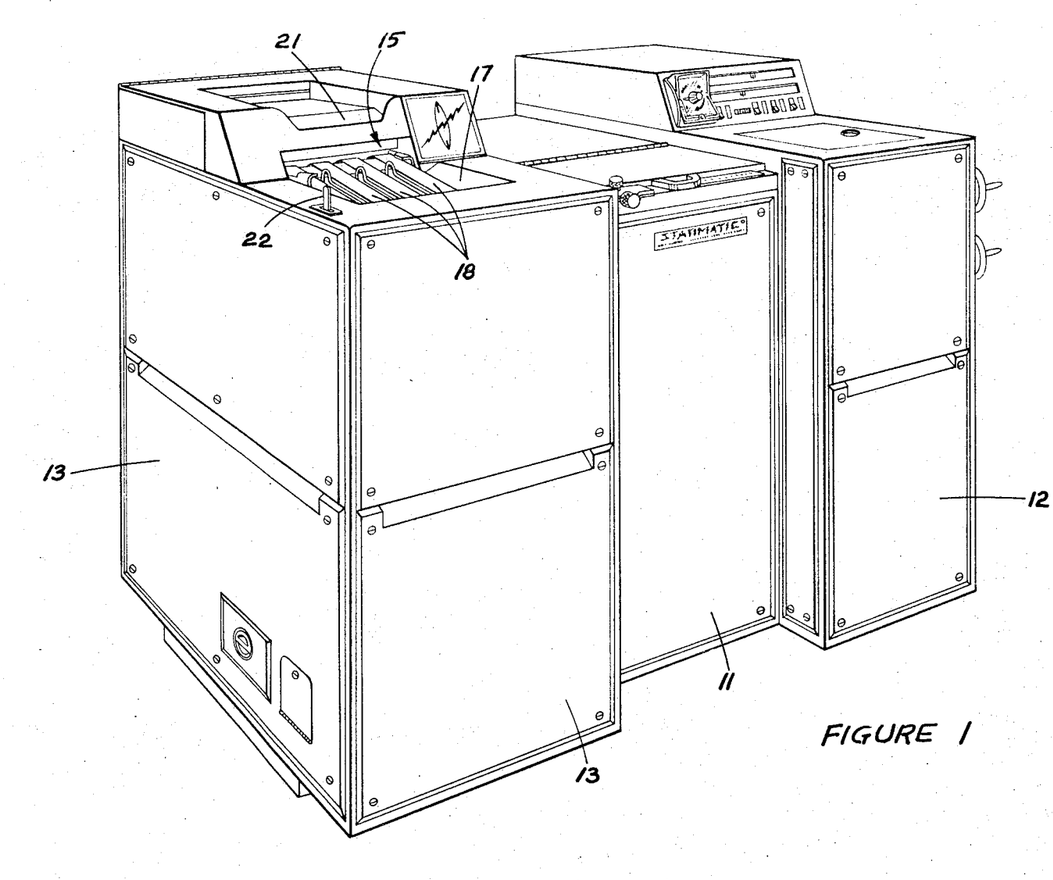
FIGURE 1 is a perspective view of the outside of the cabinet of a specific embodiment of the apparatus described by our copending application, Ser. No. 189,758, filed April 24, 1962, which includes as an essential component the specific embodiment of the sheet transport apparatus of this invention described hereinafter.
Figure 2:
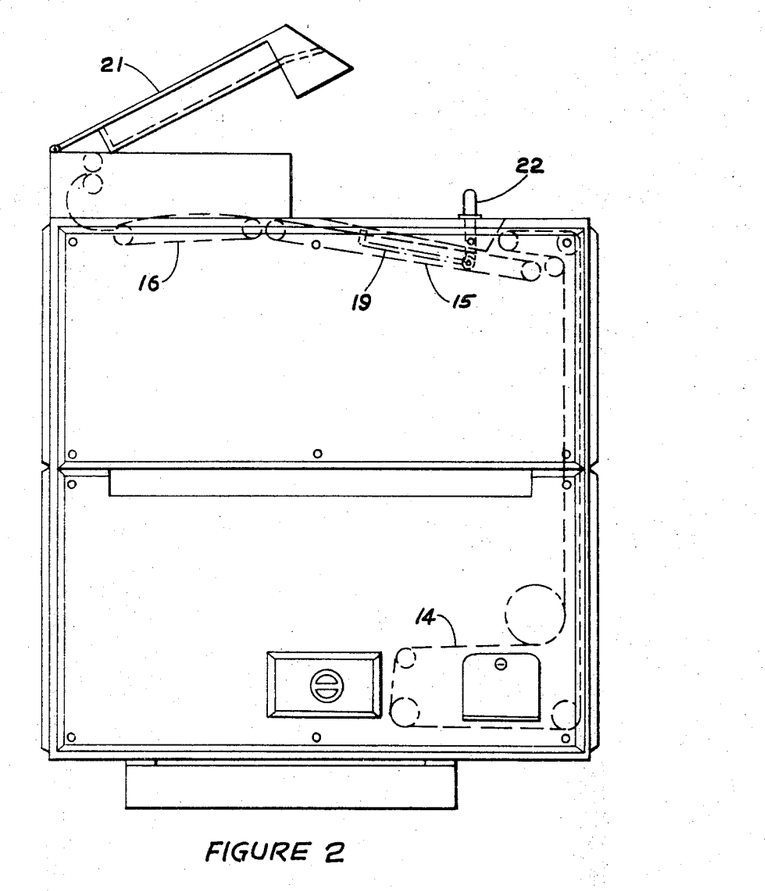
FIGURE 2 is an elevation of the left and of the outside of the apparatus of FIGURE 1, showing in broken outline the position of an embodiment of this transport apparatus.
Figure 3:
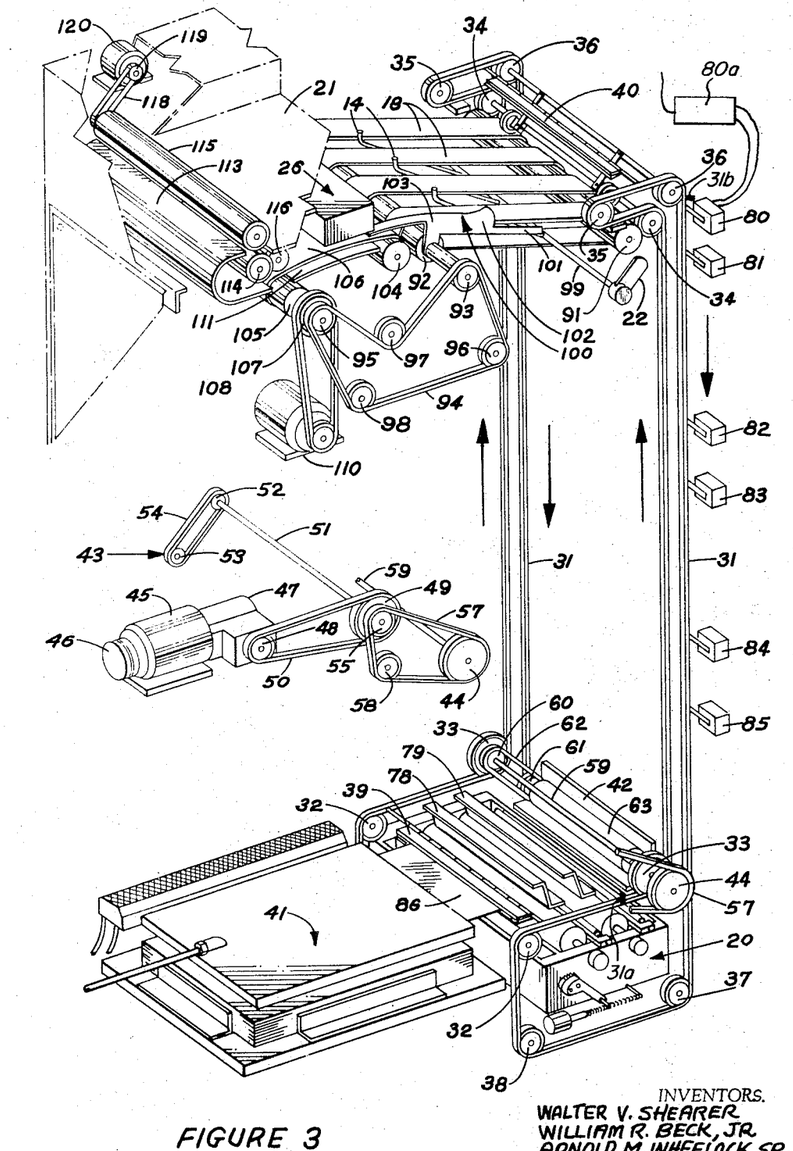
FIGURE 3 is a partially exploded view of the transport apparatus of this invention, showing its relationship to the corona discharge unit, the toner unit and the fuser unit of the apparatus illustrated by FIGURES 1 and 2.

FIGURES 3, 4, 5, 6, 7 and 8 illustrate the details of a specific embodiment of the transport apparatus of this invention which is contained in the cabinet illustrated by FIGURES 1 and 2. FIGURE 1 shows the inspection station and delivery station of this transport apparatus, while FIGURE 2 shows in broken outline the location of this transport apparatus within the cabinet. FIGURE 3 illustrates each of the three sections of this transport apparatus and shows its relationship to processing units of a photoelectrostatic reprographer. The processing units shown by FIGURE 3 are described in detail by our copending application, Ser. No. 189,758, filed Apr. 24, 1962, now U.S. Patent No. 3,180,239, and do not form a part of the invention with which this specification is concerned.

Referring specifically to FIGURE 1, it will be seen that the cabinet in which the apparatus of this invention is housed consists of a center section 11, a right-hand section 12 and a left-hand section 13. The apparatus of this invention is located in the left-hand section 13. The position of this apparatus in section 13 is shown in broken outline by FIGURE 2. Referring specifically to FIGURE 2, it will be seen that the first section of this apparatus, designated generally by the numeral 14, has a horizontal portion near the bottom of the cabinet, a second part extending upwardly near the front of the cabinet and a third part near the top of the cabinet. The second section 15 of this apparatus is directly beneath the top of the cabinet and is at a slight angle thereto. The third section 16 of the apparatus generally parallels the top of the cabinet with an upwardly curved section near the rear of the cabinet.

Referring again to FIGURE 1, it will be seen that the upper surface of section 13 of the cabinet has a rectangular opening 17 which exposes the inspection station of the second section 15 of this apparatus. The belts 18, 18 of this second section 15 can be seen through the opening 17, together with the rods 19, 19 which form the rack by which a sheet can be lifted from the belts 18, 18 for removal from the apparatus. These rods are raised or lowered by the use of the lever 22 at the top of the apparatus. The top of section 13 of the cabinet is also provided with a tray 21 which is the copy-receiving station of the apparatus. As can be seen by reference to FIGURE 2, this tray 21 is hinged on its rearward edge to permit it to be raised to permit access to the fuser unit of the apparatus.

Referring specifically to FIGURE 3, it will be seen that this conveyor system travels along a path which carries a copy sheet in contact with the magnetic brushes of the toner unit designated generally by the numeral 20 and beneath the shoes above that unit. As shown by FIGURE 3, the toner unit 20 is located directly behind the copy sheet supply magazine and at approximately the same level in section 13 of the cabinet of the apparatus. This transport system then travels upwardly to carry a copy sheet to the inspection station at the rectangular opening 17 in the top of section 13, under the fuser unit designated generally by the numeral 26 and, finally, to the receiving tray 21 of the apparatus.

Figure 4:
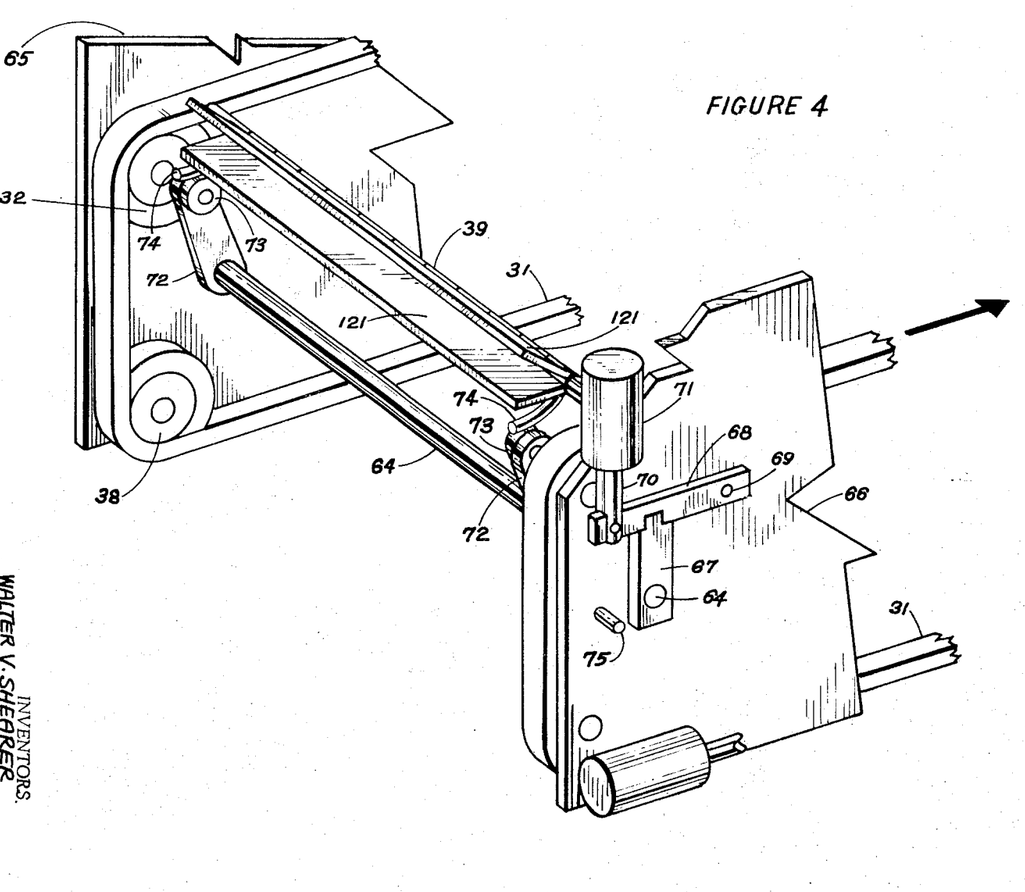
FIGURE 4 is a perspective view of the receiving end of the first section of this transport apparatus adjacent the vacuum platen of the apparatus of FIGURE 1, showing a gripper of the apparatus of this invention in open position and the details of the mechanism for the opening and closing of the two grippers of the first section of this apparatus in the position in which they receive a copy sheet.
Figure 5:
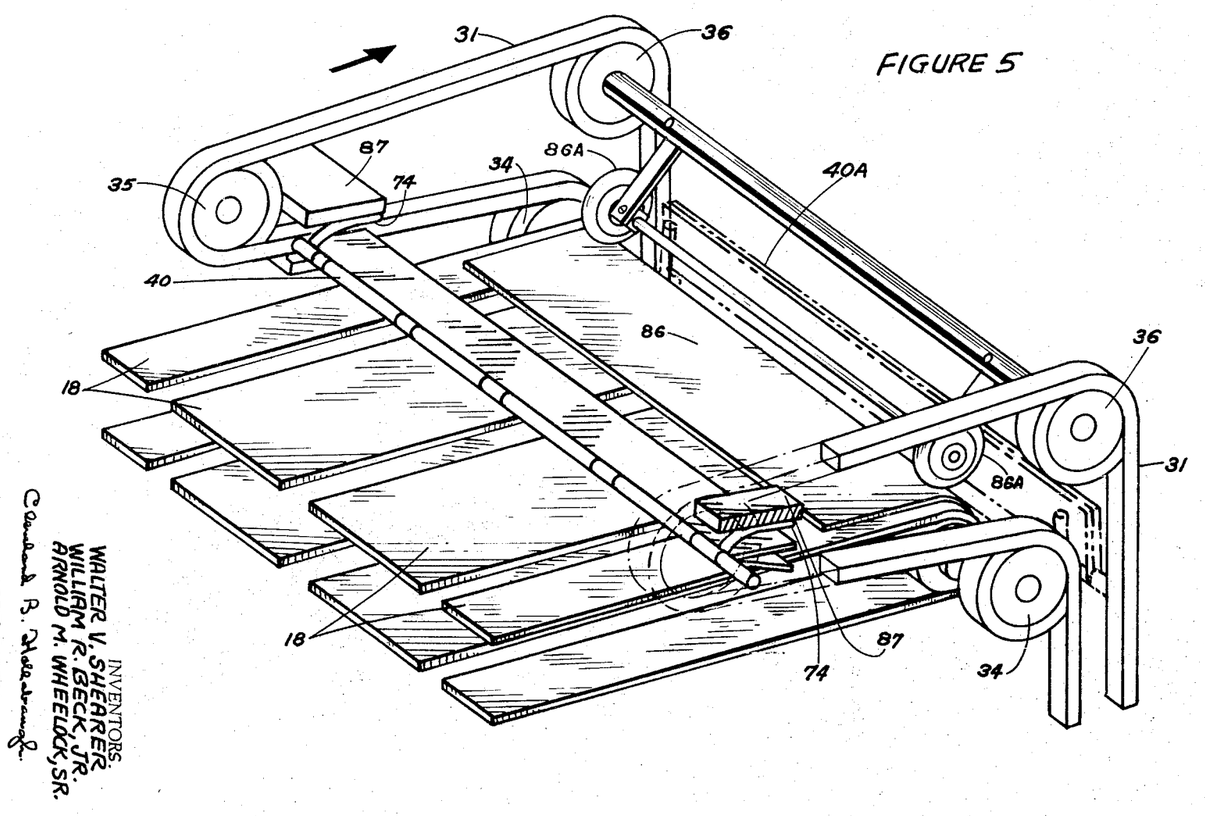
FIGURE 5 is a fragmentary, perspective view of the delivery end of the first section of this transport apparatus and of the receiving end of the second section thereof, showing a gripper in the open position after delivering a copy sheet to the second section of this transport apparatus.

The first of the three sections of this conveyor system comprises two transport belts or chains 31, 31, which are in vertical, parallel planes and are carried by pairs of pulleys or sprockets 32, 32; 33, 33; 34, 34; 35, 35; 36, 36; 37, 37 and 38, 38. FIGURES 3, 4 and 5 illustrate belts and pulleys for the sake of clarity. However, chains and sprockets are preferred in this conveyor system since they provide a positive drive, which is important to the precise functioning of the apparatus without the slippage which is frequently encountered with belts and pulleys. A roller type of chain has been found satisfactory for this purpose.

Figures 6, 7, 8:
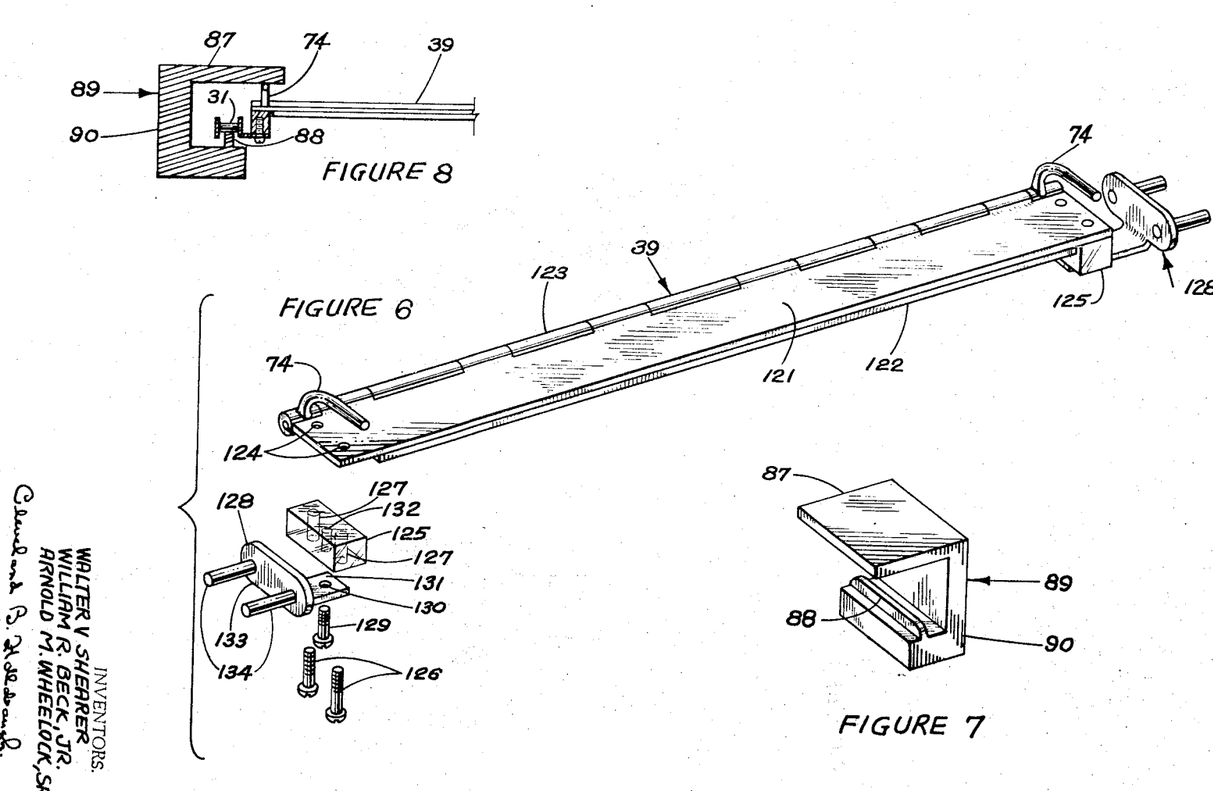
FIGURE 6 is an exploded perspective view of one of the grippers of the first section of this apparatus.
FIGURE 7 is a perspective view of one of the two anvil blocks at the delivery end of the first section of this apparatus.
FIGURE 8 is a cross-sectional view of one of the two anvil blocks illustrated by FIGURE 6.

The transport chains 31, 31 carry two copy sheet grippers 39 and 40, which are attached at each end to the respective chains so that they extend laterally across the transport system. The grippers 39 and 40 are spaced apart along the lengths of the chains 31, 31 by one-half of their total lengths. FIGURE 6 illustrates the detail of one of these grippers 39 and 40. The grippers 39 and 40 are spring loaded to keep them in the closed position, and are opened when they come adjacent the vacuum platen 41, and then closed at that location to remove a sheet from the vacuum platen when it is in its laterally displaced position by a tripper mechanism, which will be described below with reference to FIGURES 4 and 6. They remain closed while conveying the copy sheet to the second section of the conveyor system, and are opened at the location at which the sheet is picked up by the second section of the system by a tripper mechanism, which will be described hereinafter with reference to FIGURES 5, 6, 7 and 8.

The sprockets 32, 32 are located adjacent the vacuum platen 41 in positions which cause the transport chains 31, 31 to bring the grippers 39 and 40, alternatively, to a position such that the lateral displacement of the vacuum platen 41 places a marginal edge of a copy sheet in a position such that it is grasped by the gripper when it is closed. The driven sprockets 33, 33 are spaced apart from the sprockets 32, 32 in positions such that the transport chains travel between them in a horizontal plane. It is while traveling in this horizontal plane that the transport chains 31, 31 carry the gripper 39 or 40, as the case may be, and a copy sheet carried thereby, in contact with the magnetic brushes of the toner unit 20.

The sprockets 34, 34; 35, 35 and 36, 36 are located near the top of the cabinet of the apparatus. The sprockets 34, 34 are located directly above the sprockets 33, 33 so that the transport chains 31, 31 travel vertically upward between the two pairs of sprockets, after making a right angle turn around sprockets 33, 33. A copy guide sweep 42 is located between sprockets 33, 33 in a position such that the back of a copy sheet carried by one of the grippers 39, 40 passes in contact with it, and the sheet is guided from horizontal to vertical travel. Two spring loaded rollers, not shown by the figures, are located near the outer edges of the convex or backward surface of the sweep 42. The rollers bear on the marginal edges of the face of a copy sheet passing around the sweep 42, and prevent the trailing end of the sheet from flopping outwardly and contacting its toned surface with the inside of the back wall of the cabinet of the apparatus.

The drive for this first section of the conveyor system and for the toner unit 20 is illustrated by FIGURE 3 as a broken-away unit designated generally by the numeral 43. It will be noted that the broken-away unit duplicates the showing of the drive sprocket 44, which fixes the position of this unit relative to the remainder of the conveyor system. It consists of an electric motor 45, provided with an electrically activated brake 46 and a speed reducer 47 which drives sprocket 48. Sprocket 48 drives sprocket 49 through the chain 50. The sprocket 49 is on one end of the axle 51, the other end of which carries the sprocket 52 which drives sprocket 53 through the electrically insulating timing belt 54, which carries teeth which positively engage the teeth of sprockets 52 and 53. The belt 54 may, for example, be made of rubber. It serves to insulate the toner unit 20 from the remainder of the drive mechanism of the conveyor system. The sprocket 53 is the main drive for the toner unit 20. The axle 51 carries a third sprocket 55 adjacent sprocket 49 which drives sprocket 56 through chain 57 which passes around the idler sprocket 58.

As shown by FIGURE 3, the sprocket 56 is affixed to the end of the axle 59 which carries the sprockets 33, 33 which drive the conveyor transport chains 31, 31 of the first section of this conveyor system. The axle 59 carries a fourth sprocket 60 which drives sprocket 61 through chain 62. The sprocket 61 is affixed to the end of an axle which carries a vibrator 63. The vibrator 63 is illustrated as a brush with bristles which extend through the slots in the adjacent sweep 42. The rotation of this brush vibrator 63 vibrates the back of a copy sheet passing around the opposite side of the sweep 42, and causes any mechanically adhering particles of iron from the toner mix to drop from the surface of the sheet.

The revolving brush vibrator described in the foregoing is only one of several forms of vibrators which are suitable for use in this apparatus. An alternative form, which may be positioned above the upper edge of the sweep 42, is a rotating bar having an irregular surface which contacts the back of a sheet of copy paper just after it has passed around the sweep, and causes the sheet to vibrate.

FIGURE 4 shows the end of the first section of the conveyor system adjacent the vacuum platen 41, with the gripper 39 cocked in open position and ready to receive the edge of a copy sheet by the lateral displacement of the vacuum platen 41.

Referring specifically to FIGURE 4, the numeral 64 designates an axle the ends of which are carried by the frame members 65 and 66 which are affixed to the main frame of the apparatus. One end of the axle 64 extends beyond the outer side of the frame member 66 and carries the lever arm 67. The lever 67 is held in a vertical position by having an end section in a notch in the lower edge of the lever arm 68. One end of the lever arm 68 is pivoted on a pin 69 attached to the frame member 66 and the other end is attached to the end of the core 70 of the solenoid 71 by a pivot joint.

The axle 64 carries two arms 72, 72 which have rollers 73, 73 positioned to bear on the arcuate lever arms 74, 74 of the gripper 39 and to force them upwardly when the lever 67 is held in position by the lever arm 68. The lever arms 74, 74 of the gripper are attached to the upper leaf thereof and, when forced upwardly, cause the gripper to open as illustrated by FIGURE 4. As shown by FIGURE 4, the arms 72, 72 are in an inclined position when they are held in position to open the gripper 39.

The activation of the solenoid 71 causes it to raise the end of the lever arm 68, freeing the axle 64 to rotate a fraction of a turn in the counter-clockwise direction. This rotation of the axle 64 is caused by the weight of the arms 72, 72 and the rollers 73, 73, causing the arms to fall from their inclined position. The rotation of the axle 64 is stopped by the lever arm 67 coming to rest against the pin 75. This rotation removes the rollers 73, 73 from their contact with the levers 74, 74 and permits the gripper 39 to close under its own spring tension. The solenoid 71 is activated by the electrical control system of the apparatus to cause the gripper 39 to close at the instant that the vacuum platen 41 reaches its laterally displaced position, placing the edge of a copy sheet in position to be grasped by the gripper.

The pin 75 is in a location such that when the lever arm 67 is resting against it, the cam rollers 73, 73 are in the path of travel of the gripper lever arms 74, 74 as the gripper 39 is carried by conveyor transport chains 31, 31 upwardly from pulleys 38, 38 and around pulleys 32, 32. As the gripper 39 moves into the position shown by FIGURE 4, the lever arms 74, 74 bring the arms 72, 72 and the axle 64 to the position shown by FIGURE 4 and causes the lever arm 67 to become locked in its vertical position by the lever arm 68. In this position, the leaves of gripper 39 are held in their open position, as shown by FIGURE 4. At the desired time, the gripper 39 may be caused to close by activation of the solenoid 71 in the manner described above.

It is essential that gripper 39 come to an accurately positioned stop in the position in which it is illustrated in FIGURE 4. This position must be accurate to permit the gripper to receive the edge of a copy sheet from the vacuum platen 41 as it comes to its laterally displaced position just prior to the end of the cycle of operations of the vacuum platen transport system. Similarly, the gripper 40 must be stopped at exactly the same location when it is, in turn, carried around by the transport chains 31, 31 to receive a copy sheet.

Referring specifically to FIGURE 3, it will be noted that a series of six limit switches 80, 81, 82, 83, 84 and 85 are spaced at accurately predetermined intervals along the path of the downward or return travel of one of the transport chains 31, 31. The particular chain involved is immaterial. That chain carries two lugs, 31a and 31b, which are, respectively, precisely spaced on the chain in relation to the position of the grippers 39 and 40, one end of each of which is carried by the chain. The tripping arms of each of the limit switches 80, 81, 82, 83, 84 and 85 are in a position relative to the path of travel of the adjacent chain 31, such that the lugs carried by the chain will trip the switch as they pass.

The contact between one of the lugs carried by one of the chains 31, 31 and the tripping arm of the limit switch 80, cocks a relay 80a included in the automatic control circuit of the apparatus. This relay controls the brake 46 on the shaft of the electric motor 45 and the operation of that motor in driving the transport chains 31, 31. The following contact between that lug and the tripping arm of the limit switch 81 activates the control relay, which stops the motor 45 by the application of the brake 46 to instantaneously stop the rotation of its shaft. The lug on the chain 31 and the tripping arm of the limit switch 81 are in exact positions to stop the motor 45 and the movement of the chains 31, 31 at the precise position which places the gripper 39 or 40, as the case may be, in the position illustrated in the case of gripper 39 by FIGURE 4. The position of gripper 40 when gripper 39 is in the position shown by FIGURE 4 is shown by FIGURE 5.

The electrical connections by which the limit switches 80 and 81 control the motor 45 and its brake 46 are fully described hereinafter in the discussion of the electrical system of this apparatus with reference to FIGURE 9.

The limit switches 82, 83, 84 and 85 control the application of a bias potential to the shoes 78 and 79 of the toner unit 20 of the apparatus.

FIGURE 5 shows the detail of the upper or forward end of the first section of the conveyor system, together with the backward end of the second section of that system, and shows the gripper 40 at the instant after it has been forced into its open position to deliver a copy sheet that it is carrying to the second section of the conveyor system. The gripper 40 or 39, as the case may be, is not stopped in being opened to deliver a copy sheet to the second section of the transport system, but is opened and then permitted to close under its own spring loading while the transport chains are in motion. The movement of the transport chains is stopped only when one of these grippers comes into position to receive a copy sheet, as described hereinbefore.

Referring specifically to FIGURE 5, it will be seen that the copy sheet 86 is being carried by the belts 18, 18 of the second transport system, and is held on those belts by the spring loaded rollers 86A, 86A. The leading edge of the copy sheet has just been released by the opening of the gripper 40 in its forward travel. The gripper 40 has pulled away from the leading edge of the copy sheet 86, because the first section of the conveyor system travels at a somewhat faster rate than its second section.

The gripper 40 has been forced open by the arcuate lever arms 74, 74 riding under the surfaces of the anvil blocks 87, 87 which force the ends of the lever arms downwardly. The chains 31, 31 of the first section of the conveyor system are riding over the shoes 88, 88, which are beneath the chains at the location that the chains are placed under stress by the contact between the lever arms 74, 74 and the anvil blocks 87, 87. The shoes 88, 88 prevent this stress from causing the chain to sag and, thereby, interfere with the opening of the gripper 40.

Referring specifically to FIGURES 7 and 8, it will be seen that the anvil blocks 87, 87 and the shoes 88, 88 are integral parts of the same members designated generally by the numerals 89, 89. As will be seen from those figures, the anvil block section 87 of the members 89, 89 is above and spaced apart from the shoe section 88 of each of the members 89, 89 and that the two sections are attached together by a vertical section 90 which is on the outwardly side of one of the chains 31, 31. As will be seen by reference to FIGURE 5, the members 89, 89 are located adjacent the sprockets 35, 35 with their respective shoe sections below and their anvil sections above the lower and forwardly traveling spans of the transport chains 31, 31.

Referring again to FIGURE 5, as the gripper 40 is moved forwardly, its arcuate lever arms 74, 74 ride out from under the anvil blocks 87, 87. Upon being released from their depressed position, the arms 74, 74 cease to counteract the spring tension which closes the gripper 40, and the gripper closes. The movement of the chains 31, 31 continues until they reach the approximate position shown in broken outline designated 40A, at which point its return movement is stopped while the gripper 39 receives a copy sheet, as described with reference to FIGURE 4.

Referring again to FIGURE 3, the second section of this conveyor system comprises a plurality of belts 18, 18 carried by the rollers 91 and 92. The belts 18, 18 are spaced apart on the rollers 91 and 92. When utilizing four belts, as shown by FIGURE 3, three spaces are provided within the transport surface provided by the four belts. The roller 92 carries a sprocket 93, which is driven through chain 94 by sprocket 95. The chain 94 passes around the idler sprockets 96, 97 and 98, which serve merely to guide the path of travel of the chain 94.

Rods 17, 17, shown as three by FIGURE 3, are positioned in the spaces between the belts 18, 18 and are attached beneath the upper span of the belts 18, 18 to a shaft 99 to form a copy-lifting rack. The shaft 99 is attached to the lever arm 22 which is readily accessible above the top of section 13 of the cabinet of the apparatus, for backward and forward movement by the operator of the apparatus. This copy-lifting rack is normally below the upper surface of the upper span of the belts 18, 18 and does not interfere with the travel of a copy sheet being carried by these belts. When the lever arm 22 is moved forward to the position illustrated by FIGURE 3, the forwardly curved ends of the rods 19, 19 are raised above the upper surfaces of the upper span of the belts 18, 18 and stop the forward travel of a copy sheet on those belts and hold it in a position within the inspection station opening 17 at the top of section 13 of the cabinet containing the apparatus so that the operator may inspect the visual image on the copy and, if desired, remove it from the apparatus for any manual correction which may be desired. The travel of a copy sheet on the belts 18, 18 is continued when the lever arm 22 is moved backwardly to lower the rods 19, 19 to their position of rest. When the rods 19, 19 are left in their depressed position of rest, the travel of a copy sheet proceeds uninterrupted across the second section of this conveyor system to its third section.

Copy sheet guide plates are located adjacent the exit end of the second section of this transport system, and function to realign a sheet carried by this transport section which may have become somewhat angulated on this transport. One of these guide plates, 100, is shown by FIGURE 3. The other guide plate on the opposite side of the conveyor system is a mirror image of the guide plate 100. It will be noted that each of these guide plates has a vertical section 101 which extends from approximately the midpoint of the outer edge of the upper span of an outer belt 18 of the second section. The copy guide plates each have a central section 102 having a vertical side wall and a horizontal upper wall which is flared upwardly, beginning at a point near the entrance end of the copy guide plate. It has an exit end section 103 which is horizontal and extends over the entrance end of the third section of this transport system.

Still referring to FIGURE 3, the third section of the three sections of this conveyor system comprises two rollers 104 and 105 which carry the wide conveyor belt 106. The roller 105 carries on the end of its axle the sprocket 95 through which the second section of the conveyor system is driven, and a second and larger sprocket 107 which is connected by the chain 108 to the sprocket 109 driven through reduction gears by electric motor 110. Thus, it will be seen that the electric motor 110 provides the drive for both the second and the third sections of this conveyor system.

The upper span of the conveyor belt 106 rides on an upwardly curved crown sweep 111, which is a plate of a material such as a structural metal which has a high heat conductivity. This crown sweep is located directly beneath the fuser unit 112, which is above and spaced away from the conveyor belt 106. This crown sweep causes the upper span of the conveyor belt and a copy sheet thereon to follow a curved path which prevents the copy sheet from curling laterally and coming into contact with the lower surface of the fuser unit 112. This crown sweep has the second function of absorbing heat from the section of the conveyor belt 106 which is immediately beneath the fuser unit, thereby preventing the base of the copy sheet carried by the conveyor belt 106 from becoming overheated during the fusion of the toner image carried on its upper surface.

Still referring to FIGURE 3, it will be seen that the upper span of the belts 18, 18 of the second section of the conveyor system are inclined upwardly in their forwardly direction of travel. Further, it will be seen that the arcuate path of travel of the upper span of the belt 106 of the third section has a generally downward inclination in its forwardly direction of travel. The differences in the slopes of the second and third sections of the conveyor system slightly bends a copy sheet across its direction of travel as it passes from the second to the third sections of the conveyor system. This bending of the sheet has an effect of preventing a lateral curling of the sheet, which is identical to that of the crown sweep 111.

The delivery sweep 113 is an arcuate plate which guides a copy sheet passing from the solid conveyor belt 106 into the nip between the rolls 114 and 115. The idler wheels 116, 116, one of which can be seen in FIGURE 3, guide a copy sheet onto the delivery sweep 113 and keep it moving around the sweep into the nip between the rolls 114 and 115.

The end of the shaft of the roll 115 carries a sprocket 117 which is connected by the chain 118 to the sprocket 119 on the shaft of the reduction gear of the electric motor 120. Thus, the electric motor 120 drives the roll 115. The roll 114 is an idler roll driven by roll 115, or by a copy sheet passing between the two rolls. Upon entering the nip between the rolls 114 and 115, a sheet of copy paper is pulled around the delivery sweep 113 and delivered to the copy-receiving tray 21 of the apparatus. The roll 115 is driven at a speed which carries a sheet of copy paper somewhat faster than the rate at which it is carried by the third section of the conveyor system, and propels the trailing edge of the sheet clear of the rolls so that it comes to rest well within the copy-receiving tray 115.

FIGURE 6 is an exploded view of a preferred form of one of the grippers 39 or 40, which are identical in construction. Referring specifically to that figure, it will be seen that these grippers have two leaves 121 and 122 which are attached together by a piano type hinge 123, which is spring loaded to keep the leaves 121 and 122 in contact with each other in what has been referred to hereinbefore as the "closed" position. The leaves 121 and 122 are made of metal and are coated on their outer sides with an electrically insulating material.

The flat surface of the upper leaf 121 is longer than the corresponding surface of the lower leaf, and extends beyond both ends of the lower leaf. Each end of the surface of the upper leaf has two threaded perforations 124, 124. The plastic insulating blocks 125, 125 are attached to each end of the leaf 121 by the screws 126, 126, which pass through perforations 127, 127 in each of the blocks 125, 125, and are threaded into the perforations 124, 124.

The insulating blocks 125, 125 are each attached to a carrier member 128 by the screw 129, which passes through the perforation 130 in the flat section 131 of the member, and is threaded into the cavity 132 in the insulating block. The member 128 has a second flat section 133, which is in a plane at right angles to the plane of its section 131 and has rounded ends. The flat section 133 carries two pins or rods 134, 134 which extend outwardly from its outer face and are attached to a transport chain 31 of the conveyor system.

The insulating blocks 125, 125 are made of a relatively fragile plastic, which will fracture under stress which is substantially lower than that required to break the chains 31, 31 or damage other parts of the conveyor system. Thus, the insulating blocks 125, 125 function both to insulate the leaves 121 and 122 from the carrier member 128 and the transport chains 31, 31 to which they are attached, and to protect the conveyor system from physical damage which could otherwise result in the event that the gripper grasped the edge of a copy sheet which had inadvertently jammed and could not be moved by the gripper.

The hinge section of the lower leaf 122 of the gripper is the same length as the upper leaf 121, and carries at each end an upstanding arcuate rod 74. The arcuate rods 74, 74 function as lever arms to force the gripper open against the spring tension of the hinge 123 when they are forced toward the upper leaf 121 of the gripper. This action has been described hereinbefore with reference to FIGURE 4 which shows the gripper in the inverted position in which it receives a copy sheet from the vacuum platen 41 of the apparatus. It has also been described with reference to FIGURE 5 which shows the gripper in the position in which it delivers a copy sheet to the second section of the conveyor system.

Our copending application, Ser. No. 189,758, filed April 24, 1962, describes in detail an automatic electrical control circuit of an apparatus for the automatic photoelectrostatic reproduction of images, of which the sheet transport apparatus of this invention is adapted to form an essential part. That automatic electrical control circuit comprises a series of stepping switches and relays, together with related elements. It does not form a part of this invention and will not be described in this specification. However, the relationship of the various electrical components of the apparatus of this invention to what control circuit will be described with reference to FIGURE 9.

Figure 9:
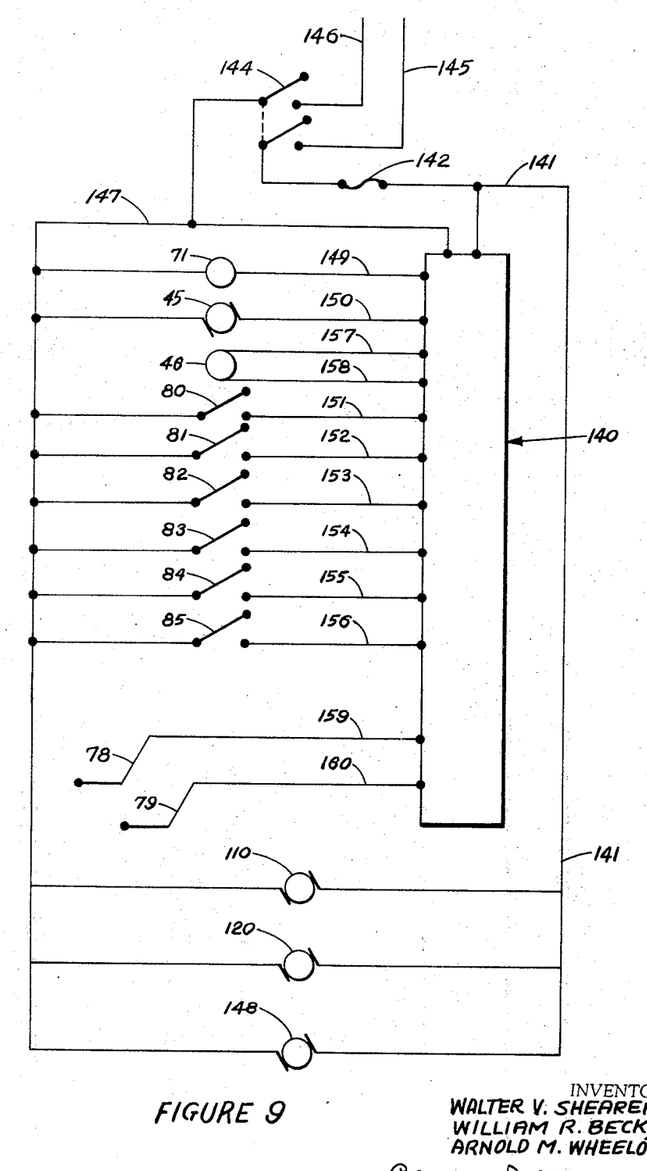
FIGURE 9 is an electrical wiring diagram showing the relationship between the various electrical components of this apparatus.

Referring specifically to FIGURE 9, it will be seen that the automatic electrical control circuit is indicated generally by the numeral 140. The relationship of the various components of the apparatus of this invention to that control circuit is connected by the electrical line 141 through the fuse 142 and the electrical line 143 to the double pole starting switch 144 of the apparatus, which is, in turn, connected by the line 145 to one side of a suitable source of alternating electric current which may be, for example, a 110 volt, 60-cycle current. The second terminal of the starting switch 144 of the apparatus is connected by the line 146 to the other side of the source of alternating current, and the corresponding terminal of the switch 144 is connected to the line 147.

The line 147 is connected to one terminal of each of the winding of the solesoid 71; the electric motor 45; the limit switches 80, 81, 82, 83, 84 and 85; the electric motor 110; the electric motor 120 and the electric motor 148. The second terminals of each of the winding of the solenoid 71; the electric motor 45; the limit switches 80, 81, 82, 83, 84 and 85 are connected, respectively, by the electrical lines 149, 150, 151, 152, 153, 154, 155 and 156 to the automatic control circuit 140. The second terminals of the electric motor 110, the electric motor 120 and the electric motor 148 are each connected to the electrical line 141.

The terminals of the electric brake 46 on the motor 45 are, respectively, connected by the electrical lines 157 and 158 to the automatic control circuit 140. The toner bias shoes 78 and 79 are, respectively, connected by the electrical lines 159 and 160 to the automatic control circuit 140. The electrical control circuit 140 is also connected to the electrical line 147.

Referring both to FIGURE 9 and to FIGURE 3, the closing of the starting switch 144 activates the automatic control circuit 140 and places the electric motors 110, 120 and 148 in operation. These motors operate continuously as long as the switch 144 is closed, i.e., as long as the apparatus as a whole is in operation. Referring again to FIGURE 3, it will be seen that the operation of the motor 110 drives the belts 18, 18 of the second section 15 of this transport apparatus as well as the single wide belt 106 of the third section 16 of the apparatus. The operation of the motor 120 drives the roll 115 of the third section 16 of the apparatus, while the operation of the motor 148, in turn, operates the blower of the fuser unit 26 to provide it with cooling air.

The electrical components of this transport apparatus other than its electric motors 110, 120 and 148 are under the direct control of the automatic control circuit 140 and are timed in their operation by the control circuit with respect to other operations of the photoelectrostatic copy apparatus of which this transport apparatus is adapted to form an essential component. The cycle of operation of this transport apparatus is initiated by the automatic control circuit 140 when the vacuum platen 41 of the copy apparatus completes a cycle of its operations to the point at which it returns to its displaced position adjacent the position in which it receives a copy sheet to begin its cycle of operations.

When the vacuum platen 41 reaches its displaced position, one of the sheet grippers 39 or 40 is in its open position adjacent the vacuum platen as illustrated by gripper 39 shown by FIGURE 4. The vacuum platen 41 by its lateral movement places an edge of the copy sheet which it is carrying between the leaves 121 and 122 of the gripper in a position to be grasped by the gripper when its leaves are closed by the spring tension on its hinge 123.

The automatic control circuit 140 causes the gripper 39 or 40, as the case may be, to grasp the edge of a copy sheet 86 as soon as the vacuum platen 41 reaches its laterally displaced position by de-energizing the winding of the solenoid 71 which was energized at the end of a prior cycle of operation of the first section 14 of the apparatus of this invention as will be explained hereinafter. The de-energizing of the winding of the solenoid 71 permits the rollers 73, 73 to drop away from the arcuate arms 73, 73, in turn, permitting the gripper 39 or 40 to close under the spring tension of its hinge 123.

After the winding of the solenoid 71 is de-energized and the gripper 39 or 40 has gripped the edge of a copy sheet 86, the automatic control circuit 140 shuts off the D.C. voltage on the brake 46 of the electric motor 45 which had been applied at the end of the preceding cycle of operation of this apparatus. At the same time, the automatic control system energizes the motor 45 to start the transport chains or belts 31, 31 of the first section 14 of this apparatus in motion to carry the copy sheet over the toner unit 20 and under the toner bias shoes 78, 79 and on to the second section 15 of this apparatus.

The automatic control 140 closes the current supply to the bias shoes 78 and 79 and readies them to supply a bias voltage to these shoes at any time the shoe 78 or 79, or both, are grounded by the operation of their associated limit switches. The movement of this first section 14 of this transport apparatus causes the normally open limit switch 82 to close by contact with one of the two lugs on the transport chain 31, completing the circuit of the bias shoe 78 to ground. This bias shoe 78 remains grounded with its bias current operable until the same lug on the transport chain 31, contacts the normally closed limit switch 84, opening it, thereby causing the automatic control circuit 140 to open the circuit between the bias shoe 78 and ground.

The tripping arm of the switch 82 and the two lugs on the transport chain 31 are precisely positioned with respect to each other and with respect to the location of the grippers 39 and 40 on the transport chains 31, 31, to cause the bias shoe 78 to become grounded at the moment the leading edge of the electrostatic image is brought under the bias shoe. The tripping arm of switch 84 and the two lugs on the transport chain are precisely positioned with respect to the location of the grippers on the transport chains 31, 31 to cause the bias shoe 78 to be disconnected from ground at the moment the trailing edge of the copy sheet passes under the bias shoe.

The ground connection of the bias shoe 79 is established by the contact of a lug on the transport chain 31 with the tripping arm of the switch 83 in exactly the same manner described above in connection with the bias shoe 78 and the switch 82. Further, the ground connection of the bias shoe 79 is broken by the action of the switch 85 in exactly the same manner as described above in connection with the bias shoe 79 and the switch 84.

The positions of the switches 83 and 85, the positions of the lugs on the chain 31 and the positions of the grippers 39 and 40 on the chain 31 relative to the bias shoe 79 are exactly the same as those of the switches 82 and 84 relative to the position of the bias shoe 78, the lugs on the chain 31 and those of the grippers 39 and 40 on the chains 31, 31 which have been described in the foregoing.

As can be seen by reference to FIGURE 3, the bias shoes 78 and 79 are spaced apart along the line of travel of the grippers 39 and 40. The switches 82 and 83 and the switches 84 and 85 are, respectively, spaced apart along the line of travel of the chain 31 by the same distance as the bias shoes are spaced apart. The spacing between switches 82 and 84 and between switches 83 and 85, respectively are identical. This spacing is the same as the length of the latent electrostatic image which is toned by the toner unit 41 in the direction of its forward travel along he conveyor system of the apparatus.

The closing of the limit switch 82 by contact with one of the two lugs carried by the chain 31 causes the automatic control circuit 140 to revert to its initial position in readiness to begin a new cycle of operations.

As already noted, when a lug on the chain 31 contacts the tripping arm of the switch 80, the automatic control circuit activates the brake 46 to stop the motor 45 to precisely position a gripper 39 or 40 in position to receive the edge of a copy sheet as illustrated by FIGURE 4.

In this specification, many details of the transport apparatus in accordance with this invention have been given. It will be readily apparent to those skilled in the art that many variations can be made in the details of the apparatus without departing from the spirit of the invention or the scope of the claims which follow.

We claim:

1. A sheet transport apparatus adapted to carry a flexible sheet from one location to another, which comprises in combination;
    a pair of continuous conveyor chains, which are of the same length and spaced apart in vertical, parallel planes;
    a plurality of pairs of sprockets, which engage the said chains and keep them taut;
    an electric motor connected through a reducing gear to one of the said pairs of sprockets;
    an electrically operated brake on the shaft of the said motor;
    at least one sheet gripper, which is spring loaded to keep it closed and is attached at its ends to the said chains, with its length normal to the said vertical planes;
    an automatic, electrical control means for stopping the electric motor, and operating the brake on its shaft to stop the movement of the conveyor chains, to position the gripper in a predetermined location, and then to release the brake and resume the operation of the electric motor;
    a means for causing the said gripper to open as it is stopped at the said predetermined location, and then to permit it to close while in that location;
    and a second means for causing the said gripper to open and then to close while the gripper is in motion, located along the course of travel of the said chains at a position remote from that of the first means for opening the gripper.

2. A sheet transport apparatus adapted to carry a flexible sheet from one location to another, which comprises in combination;
    a pair of continuous conveyor chains, which are of the same length and spaced apart in vertical, parallel planes;
    a plurality of pairs of sprockets, which engage the said chains and keep them taut;
    an electric motor connected through a reducing gear to one of the said pairs of sprockets;
    an electrically operated brake on the shaft of the said motor;
    two sheet grippers, the end of each of which are attached to the conveyor chains with their lengths normal to the said vertical planes, and which are spaced apart along the lengths of the conveyor chains by approximately one-half of their length;
    an automatic, electrical control means for stopping the motor and operating the brake on its shaft, to stop the movement of the said conveyor chains, to alternatively position the said grippers in a predetermined location, and to release the brake and resume the operation of the electric motor;
    a means for causing each of the said grippers to open as it is being stopped at the said predetermined location, and then to permit it to close while in that location;
    and a second means for causing the said grippers to open and then to close while they are in motion, located along the course of travel of the said chains at a position remote from that of the first means for opening the gripper.

3. The sheet transport apparatus adapted to carry a flexible sheet from one location to another described by claim 1, in which the gripper comprises in combination;
    two elongated, rectangular, metal leaves of different lengths attached together along an elongated edge of each by a spring loaded hinge, with approximately equal end sections of the longer leaf extending beyond the ends of the shorter leaf;
    a plastic insulating block attached to each of the said end sections of the longer leaf;
    a carrier member attached to each of the plastic insulating blocks, and electrically insulated thereby from the said leaves of the gripper, each of the said carrier members being adapted for attachment to a conveyor chain at right angles to the length of the said gripper;
    and a pair of arcuate lever arms attached near the opposite ends of the said gripper to the shorter of the said leaves, and extending outwardly adjacent the outer surface of the longer of the said leaves which, upon being forced toward the surface of the adjacent leaf, causes the gripper to open against the spring tension of its spring loaded hinge.

4. The sheet transport apparatus adapted to carry a flexible sheet from one location to another described by claim 2, in which each of the grippers comprise in combination;
    two elongated, rectangular, metal leaves of different lengths attached together along an elongated edge of each by a spring loaded, piano type hinge, with approximately equal end sections of the longer leaf extending beyond the ends of the shorter leaf;
    an electrically insulating coating on the outer surfaces of the said leaves;
    a plastic insulating block attached to each of the said end sections of the longer leaf, which is characterized by physical strength lower than the strength of the outer components of the conveyor which is adequate for normal service requirements, but which permits its breakage in the event of a malfunctioning of the conveyor by a force below that required to damage other components of the conveyor;
    a carrier member attached to each of the plastic insulating blocks, and electrically insulated thereby from the said leaves of the gripper, each of the said carrier members being adapted for attachment to a conveyor chain at right angles to the length of the said gripper;
    and a pair of arcuate lever arms attached near the opposite end of the said gripper to the hinged side of the shorter of the said leaves, and extending outwardly adjacent the outer surface of the longer of the said leaves which, upon being forced toward the surface of the adjacent leaf, causes the gripper to open against the spring tension of its spring loaded hinge.

5. The sheet transport apparatus adapted to carry a flexible sheet from one location to another described by claim 1, in which the gripper comprises in combination;
    two elongated, rectangular, metal leaves attached together along an elongated edge of each by a spring loaded hinge;
    and a pair of arcuate lever arms attached near the opposite ends of the said gripper to the hinged side of one of the said leaves, and extending outwardly adjacent the outer surface of the other of the said leaves which, upon being forced toward the surface of the adjacent leaf, causes the gripper to open against the spring tension of its spring loaded hinge;

in which the plurality of pairs of sprockets are disposed in the parallel, vertical planes, and the direction of travel of the conveyor chains are such that the chains pass upwardly between two pairs of the sprockets and then along a horizontal path of travel, in which the said gripper is attached to the said chains with its arcuate lever arms on its lower side when it is being carried by the conveyor chains along the said horizontal path of travel;

in which the predetermined location at which the said gripper is stopped is located in close proximity of the beginning of the said horizontal path of travel;

and in which the means for causing the said gripper to be opened as it is stopped at the said predetermined location and then to permit it to close while in that location comprises in combination;

a horizontal axle carried by parallel, vertical, frame members, located below the said horizontal line of travel of the conveyor chains, having an end section extending through the vertical frame members which carry it;

two lever arms attached to the said horizontal axle, within and adjacent to the said vertical frame members;

rollers on the outer ends of the said lever arms, located with their peripheries in the line of travel of the arcuate lever arms of the said gripper, in positions such that the lever arms are rotated in an upwardly direction to a position inclined to the vertical, by contact with the arcuate lever arms as the gripper comes into the said predetermined location at which it is stopped, in which position the said rollers bear on the said arcuate lever arms with a force which overcomes the tension of the spring-loaded hinge of the gripper, and causes it to open;

a lever arm attached to the end section of the axle, which extends through one of the said frame members in a position such that it extends upwardly and approximately vertically from the said axle, when the lever arms within the said frame members are in the upwardly inclined position in which they cause the said gripper to open;

a second lever arm having one end attached to a pivot carried on the outside of the said vertical frame member, the length of which is substantially horizontal, and which engages the upper end of the lever carried by the outer end section when that lever is brought into its substantially vertical position;

a solenoid which has a core, which is pulled upwardly when the solenoid is energized, the outer end of which is pivotally attached to the rotatable end of the said second lever arm and which, upon being energized, causes the second lever arm to free the end of the first lever arm, permitting the axle to rotate under the gravitational force on the lever arms between the said vertical frame members, permitting the said gripper to close;

a pin on the outside of the vertical frame member adjacent the lever arm carried by the end section of the axle, which stops the rotation of that lever, the axle, and the lever arms between the vertical frame members, at a point at which the said rollers are out of contact with the arcuate lever arms of the gripper when the gripper is in a stationary position, but within the path of travel of those arms as the gripper approaches the location at which its travel is stopped;

and an automatic, electrical control means which energizes, and then de-energizes, the said solenoid after the gripper has been stopped and opened, to cause the gripper to again close.

6. The sheet transport apparatus adapted to carry a flexible sheet from one location to another described by claim 1, in which the gripper comprises in combination;

two elongated, rectangular, metal leaves attached together along an elongated edge of each by a spring loaded hinge;

and a pair of arcuate lever arms attached near the opposite ends of the said gripper to the hinged side of one of the said leaves, and extending outwardly adjacent the outer surface of the other of the said leaves which, upon being forced toward the surface of the adjacent leaf, causes the gripper to open against the spring tension of its spring loaded hinge;

in which a plurality of pairs of sprockets are disposed in parallel vertical planes, and the direction of travel of the conveyor chains are such that the chains travel upwardly along a substantially vertical path of travel, then in a forwardly path of travel which is approximately horizontal for a short distance, in a reverse path of travel which is approximately horizontal, and then in a downwardly path of travel along a substantially vertical path in which the arcuate lever arms of the said gripper are on the upper side of the gripper when it is carried along the said forwardly, approximately horizontal, path of travel;

and in which the second means for causing the said gripper to open and then to close while the gripper is in motion is located adjacent the ends of the paths of approximately horizontal, forwardly travel of the conveyor chains, and each of which comprises;

a shoe section positioned beneath and directly adjacent one of the said chains;

a vertical connector section adjacent the outer side of the chain;

and an upper-anvil section above the said chain and spaced apart from the said shoe section by a distance which causes the chain to be supported by the said shoe section, and the arcuate lever arm of the gripper to be depressed, causing the gripper to open as it passes beneath the said anvil section.

7. The sheet transport apparatus adapted to carry a flexible sheet from one location to another described by claim 1, in which the automatic, electrical control means for stopping and starting the motor and operating the brake on its shaft comprises in combination;

a first limit switch positioned adjacent the path of travel of one of the conveyor chains;

a second limit switch positioned adjacent the path of travel of the same conveyor chain, and spaced forwardly along the line of travel of the chain from the location of the first limit switch;

a lug carried by the said conveyor chain which is adapted to trip the first limit switch, and then the second limit switch, as it is carried successively past them;

the said lug and the said second limit switch being located with respect to the length of the said conveyor chain and the location of the gripper on the chain, at positions such that the lug trips the said second limit switch when the gripper reaches the predetermined location at which it is to be stopped;

and a relay which is cocked by the tripping of the first limit switch, and then activated, to cause it to stop the electric motor and apply the brake to the shaft of the electric motor when the second limit switch is tripped.

8. The sheet transport apparatus adapted to carry a flexible sheet from one location to another described by claim 2, in which the automatic, electrical control means for stopping and starting the motor and operating the brake on its shaft comprises in combination;

a first limit switch positioned adjacent the path of travel of one of the conveyor chains;

a second limit switch positioned adjacent the path of travel of the same conveyor chain, and spaced forwardly along the line of travel of the chain from the location of the first limit switch;

two lugs carried by the said conveyor chain which are each adapted to trip the first limit switch, and then the second limit switch, as it is carried successively past them, the said lugs being spaced apart on the said conveyor chain exactly the same distance that the grippers are spaced apart on the chain;

the said lugs and the said second limit switch being located with respect to the length of the said conveyor chain and the location of the said grippers on the chain, at positions such that one of the said lugs trips the said second limit switch when one of the grippers reaches the predetermined location at which the grippers are alternatively stopped;

and a relay which is cocked by the tripping of the first limit switch, and then activated, to cause it to stop the electric motor and apply the brake to the shaft of the electric motor when the second limit switch is tripped.

References Cited

UNITED STATES PATENTS

| | | | |
|---|---|---|---|
| 2,795,861 | 6/1957 | Black | 271—79 X |
| 2,884,244 | 4/1959 | Bowman | 271—79 X |
| 2,950,915 | 8/1960 | Golding | 271—79 X |
| 3,032,341 | 5/1962 | Reist | 271—79 |
| 3,037,133 | 5/1962 | Peach | 310—77 |

M. HENSON WOOD, JR., *Primary Examiner.*

ALLEN K. KNOWLES, *Examiner.*